United States Patent [19]

Hovnanian

[11] Patent Number: 4,632,602
[45] Date of Patent: Dec. 30, 1986

[54] CHEMICAL DUMP SITE CONTAINMENT FLOOR

[76] Inventor: Vahak S. Hovnanian, Suite 12, Village Mall, Freehold, N.J. 07728

[21] Appl. No.: 592,886

[22] Filed: Mar. 23, 1984

[51] Int. Cl.[4] .............................................. E02C 3/00
[52] U.S. Cl. ..................................... 405/128; 52/594; 405/52
[58] Field of Search ................. 405/128, 129; 52/594, 52/588, 589, 721

[56] References Cited

U.S. PATENT DOCUMENTS

| | | | |
|---|---|---|---|
| 940,227 | 11/1909 | Benas | 52/594 |
| 1,662,727 | 3/1928 | Wait . | |
| 1,773,417 | 8/1930 | Whitacre | 405/43 |
| 1,883,468 | 10/1932 | Barbour | 405/43 |
| 2,882,714 | 4/1959 | Eagle et al. . | |
| 3,113,628 | 12/1963 | Orcutt | 173/152 |
| 3,172,508 | 3/1965 | Doering et al. | 52/594 X |
| 4,104,837 | 8/1978 | Naito | 52/173 R |
| 4,146,347 | 3/1979 | Woods | 405/184 |
| 4,252,462 | 2/1981 | Klingle et al. | 405/129 |
| 4,358,221 | 11/1982 | Wickberg | 405/128 |
| 4,365,913 | 12/1982 | Bonvoisin | 405/184 |
| 4,369,002 | 1/1983 | Kostylev et al. | 405/184 |
| 4,448,571 | 5/1984 | Eckels | 405/262 X |

FOREIGN PATENT DOCUMENTS 95711 7/1980 Japan .................................. 405/269

Primary Examiner—Dennis L. Taylor
Attorney, Agent, or Firm—Richard C. Woodbridge

[57] ABSTRACT

The floor under a chemical dump site is formed from a plurality of floor elements sealed with respect to each other by grouting material. Each floor element includes a male rib on one side and a female groove on the other side. The male rib has a dovetail geometry which is complementary to the geometry of the female groove. The male and female parts are adapted to mate and lock when the male rib slides longitudinally into the female groove thereby locking adjacent floor members to each other. The floor members are driven one behind the other in a string under the dump site. The male rib of one string engages the female groove of the next adjacent string until a floor of interlocking element strings is formed. Each floor member includes a hollow central channel running from end to end and a plurality of smaller apertures communicating the central channel with the vicinity of the male/female connection. Grouting material under pressure pumped into the central channel passes out through the apertures and into the vicinity of the male/female connection thereby sealing adjacent elements with respect to each other and forming a liquid impervious floor under the dump site. The same technique can be used to form a wall around the periphery of the site.

9 Claims, 13 Drawing Figures

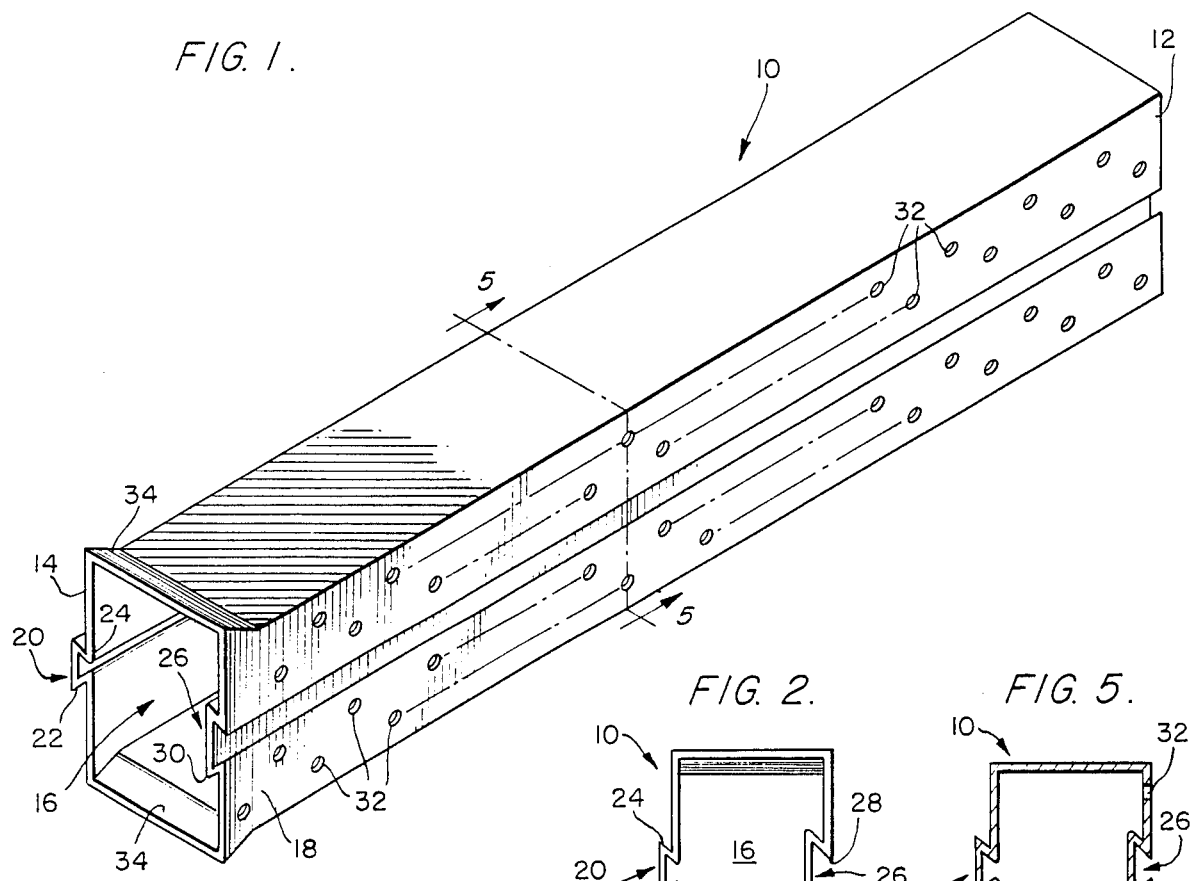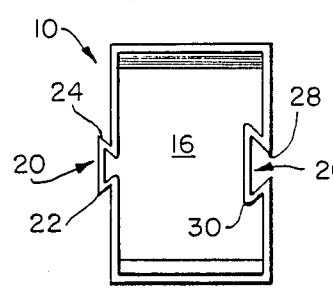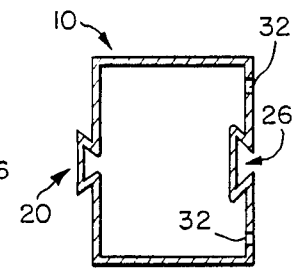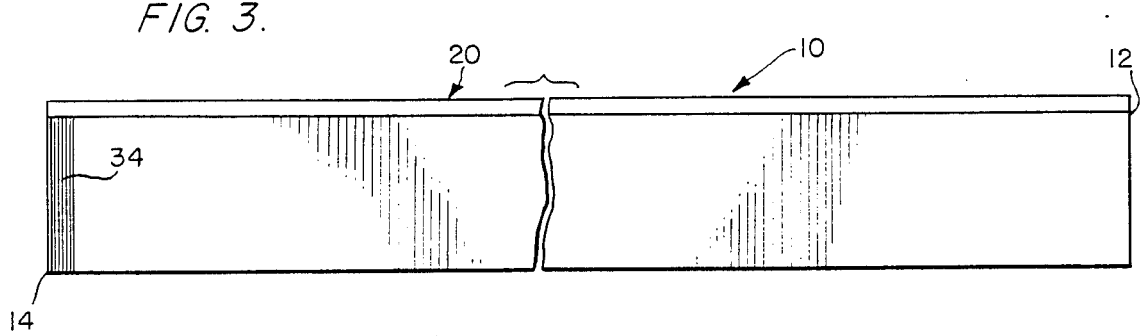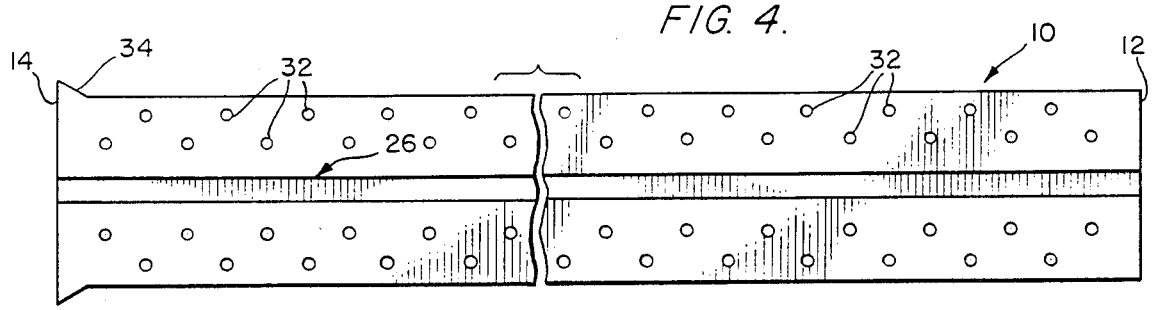

CHEMICAL DUMP SITE CONTAINMENT FLOOR

BACKGROUND OF THE INVENTION

1. Field of the Invention

The invention relates to a method and apparatus for forming a liquid impervious floor under a chemical dump site form a string of interlocking floor elements.

2. Description of the Prior Art

The problem of aging and leaking chemical dump sites is one that is slowly being recognized as a major health hazard. The most common method of dealing with the problem is to cover the site over with a sealing material and then build a wall around the area. Unfortunately that approach is expensive. Alternatively the entire site can be dug up and removed to an unpopulated area where a new dumping pit has been dug. The new pit can have a preformed floor and preformed sidewalls. That approach is also very expensive and time consuming. What is required is a relatively inexpensive and easy way to build containment barriers in situ around and existing dump sites.

One of the more relevant prior art patent references teaches a method for building an underground barrier. Japanese Pat. No. 55-9571 entitled "Forming Process for Underground Hardened Matter" discloses a technique for building a horizontal subterranean wall. Initially, a boring device is placed in a trench. A horizontal hole is then bored in the earth. A casing is subsequently placed in the bored hole and a reinforcing means is placed into the casing. Ground hardening material is then pumped into the casing and the casing is then pulled back, allowing the ejected material and the ground to harden. The sequence is repeated at an adjacent position to produce a continuous wall. The Japanese patent differs in several important respects from the present invention. In particular, there is no use of interlocking adjacent channels which stay in place after the ground hardening material is forced into the bore hole.

U.S. Pat. No. 2,882,714 is of general interest in that is discloses the use of interlocking blocks to line the floor of a structure requiring an impervious liner. The patent discusses the use of tenons and recesses which interlock with each other in a dovetail fashion.

U.S. Pat. No. 1,662,727 discloses an invention entitled "Metallic Bonding for Concrete Supports". I-beams are notched and laid on top of each other in order to form a crib which can be filled with a suitable concrete material. The reference is useful only in that it discloses the use of interlocking structural members which receive a grout-like material.

U.S. Pat. No. 4,104,837 is interesting in that it discloses a rather unusual technique for constructing a wall. Modular wall units interlock along their side edges and can be filled with insulation or other appropriate material. The units are open along their sides thereby permitting the flow of insulation between adjacent modular sections. The teaching in U.S. Pat. No. 4,104,837 appears to differ from the present invention in that it does not allow itself to be driven into position to form the floor of a chemical waste site. In addition, that patent does not appear to disclose a means of communication between the wall units and the exteriors thereof (as opposed to between interior sections of adjacent wall units).

U.S. Pat. No. 4,358,221 is directed towards the containment of chemical waste. The reference refers to a "tongue and groove" section that appears to relate only to the method by which the over burden is attached to the lower portion of the structure.

U.S. Pat. No. 4,252,462 discloses a structure for the treatment of surface chemicals for landfill sites. The structure includes a liquid impervious bed of suitable thickness U.S. Pat. No. 3,113,628 is of interest in that it discloses a machine for drilling a horizontal bore into the ground and then placing a desired length of pipe into the bored hole. It is believed that there are other devices which will perform the same function.

U.S. Pat. No. 4,365,913 describes a method of installing pipe horizontally in the ground from a vertical access shaft. This patent appears to describe yet another technique for laying a section of pipe or other material horizontally.

U.S. Pat. No. 4,369,002 discloses a method of emptying pipe that has been driven into the ground. It is likely that there are other methods for performing the same function.

Finally, U.S. Pat. No. 4,146,347 is of interest in that it discloses yet another technique for boring horizontal holes. The pipe is vibrated into position before the dirt is pulled out.

While the prior art references are relevant to the general concept described in this application, none of them, either taken in combination or individually appear to hint, teach or suggest the novel invention described herein for forming a liquid impervious floor under a chemical dump site or the like.

SUMMARY OF THE INVENTION

Briefly described the present invention compriese a method and apparatus for forming a liquid impervious floor under a chemical dump site from a string of interlocking floor elements each having a male and a female section. Each floor member preferably includes a male rib on one side and a female groove on the other. The floor elements are hollow and include a channel that runs the length of the elements from one end to the other. One end of each element is flared and adapted to mate in the non-flared end of successive elements. Each floor element also includes a plurality of apertures in the vicinity of the male or female section which communicate the hollow central channel with the exterior. The apertures are of sufficient size to allow grouting material to flow through the central channel of the pipe and out of the apertures in the vicinity of the male and/or female sections.

A floor is formed under a chemical dump site by first digging a vertical access pit next to the site. A boring machine located in the bottom of the pit is employed to drive a string of floor elements, one after the other, under the site. After the first string is laid, a second string is laid directly adjacent thereto in such a manner that the male rib of one string interlocks with the female groove of the other. The process is repeated until the area under the chemical dump site is filled up with the interlocking strings of floor elements. Lastly, grouting material is forced into the hollow central channels of each of the element strings. The grouting material passes through the apertures in each floor element and into the vicinity of the male/female locking connection thereby sealing the gaps bertween adjacent floor element strings. Alternatively, the pipe elements can be welded end to end in order to form a more perfect seal.

The same technique can also be used to form the vertical side walls around a chemical dump site. Under those circumstances a weld might be formed between the vertical wall and the floor underneath.

These and other features of the invention will be further understood by reference to the following drawings.

BRIEF DESCRIPTION OF THE DRAWINGS

FIG. 1 is a perspective view of a single floor element 10 according to the preferred embodiment of the invention.

FIG. 2 is an end view of the floor element of FIG. 1.

FIG. 3 is a top plan view of the floor element of FIG. 1.

FIG. 4 is a side elevational view of the floor element of FIG. 1.

FIG. 5 is a cross-sectional view of the floor element of FIG. 1.

DETAILED DESCRIPTION OF THE PREFERRED EMBODIMENT

Figure 6:
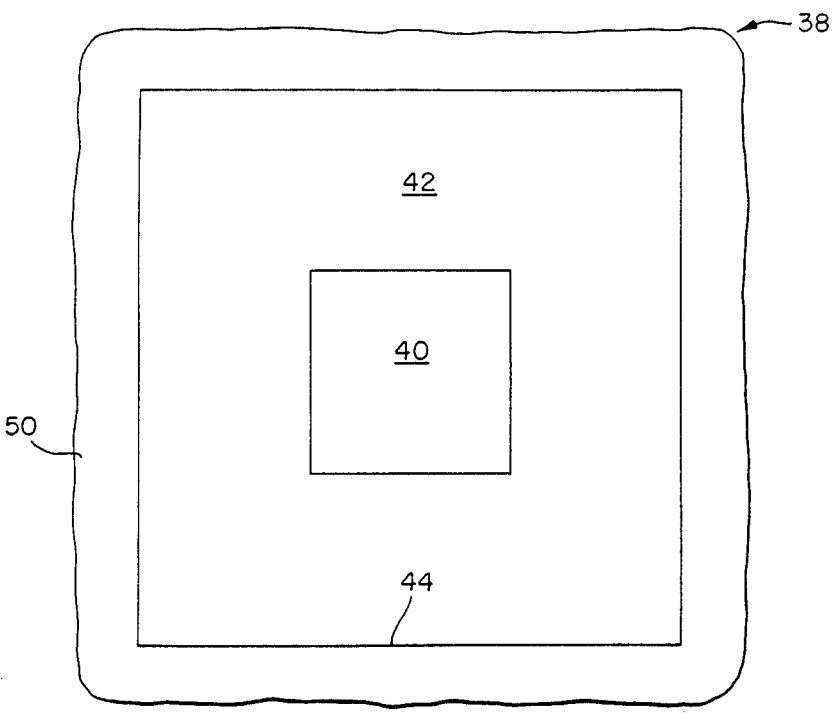
FIG. 6 is a top plan view of a typical chemical dump site.

During the course of this description like numbers will be used to identify like elements according to the different views that illustrate the invention.

A typical floor element 10 is illustrated in detail in FIGS. 1 through 5. Each floor element includes a front end 12 and a flared rear end 14 which is adapted to mate with the front end 12 of suceeding floor elements. A hollow interior channel 16 extends the length of element 10 from front end 12 to rear end 14. A plurality of apertures 32 communicate the interior channel 16 to the exterior 18 of the floor element 10. Each floor element 10 preferably has a rectangular or square cross-section as shown in FIG. 5. One side face of the floor element 10 carries a male projection 20. Each male projection includes a relatively broad head 22 and a narrow waste 24 having the general shape of a dovetail. A female groove or indentation 26 is located on the opposite side face of the floor element 10 and has a geometry that is exactly complimentary to the male projection 20. Each female groove 26 includes a narrow opening 28 and a broad interior section 30. The male projection 20 can mate with the female groove 26 by sliding the male projection 20 longitudinally into the female groove 26 of an adjacent floor element 10. Strings of floor elements 10 can be formed by inserting the front end 12 of one element into the flare 34 of the rear end 14 of a preceeding element and repeating the process for as long as necessary to form the string. Alternatively, the element 10 can be formed without a flate 34 and welded end to end to form a string. The apertures 32 are preferably located on the female side of the floor element 10 but could, alternatively be located on the male side of the floor element 10 or on both sides. Apertures 32 are large enough to allow grouting material 36 to flow under pressure through the hollow interior channel 16 and through the apertures 32 into the vicinity of the male/female locking interconnection. The purpose of the grouting material 36 is to seal the area between adjacent, interlocking floor elements 10 in a manner that is described below. A typical floor element 10 might be formed from stainless steel. However, the exact choice of material would depend upon the chemical nature of the contaminants in the dumping area. Accordingly, other materials such as hard ceramics, plastics, iron, or other alloys could be used as well. Whatever material is used would have to be (1) strong enough to withstand the mechanical forces inherent in forming the floor under the pit and (2) chemically resilient enough to withstand the corrosive effects of the chemicals in the dump site. There are also several different types of grouting materials that could be employed. The material should preferably be capable of being pumped under pressure through the hollow interior channel 16 and out of the apertures 32 to fill the space between adjacent floor elements. The grouting material should also have the characteristic of hardening or setting up after a period of time so that it doesn't dissolve away.

FIG. 6 illustrates a top plan view of a typical chemical contaminated dump site 38. Each site 38 generally includes a contamination area 40 and a leaching area 42. The contaimination area 40 is the place where the chemical contaminants 46 were originally placed. The leaching area 42 is the space into which the chemicals 46 from the contamination area 40 have spread over a period of time. The spreading of chemicals 46 into the leaching area 42 can be under the influence of osmosis, water migration, or other natural forces. A typical dump site 38 will include a containment wall 44 typically made from clay or similar materials. Clay is also used to form a containment cover 48 over the contamination area 40 and the leaching area 42 to protect the materials below from the effects of natural erosion. The containment cover 48 is clearly shown in detail in FIG. 7. While the clay containment wall 44 and the clay containment cover 48 protect the dump site 38 from above and from the sides, they do not provide protection from below. Accordingly, the present invention is directed towards a method for safely and efficiently forming a floor in situ under the dump site 38.

Figure 7:
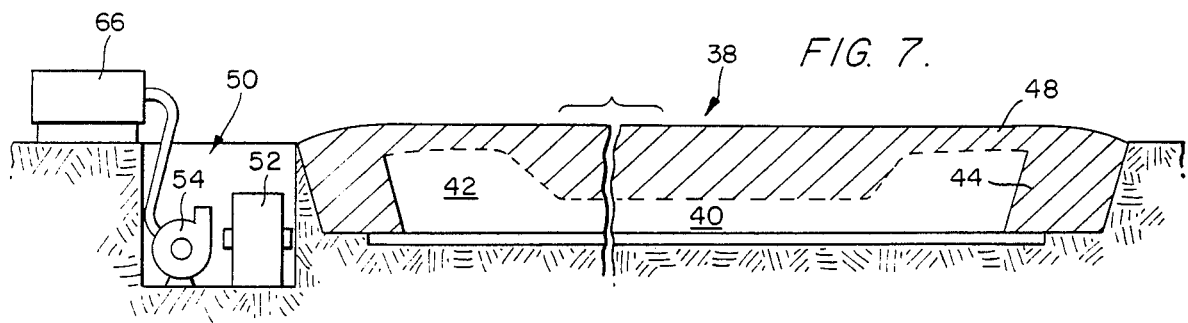
FIG. 7 is a cross-sectional view of the chemical dump site of FIG. 6 showing the machinery used to construct the floor.

FIG. 7 also shows a working pit 50 located at the side of the chemical dump 38. The working pit 50 preferably has sufficient room to accomodate a drilling machine 52 for inserting floor elements 10 under the site 38 and a pump 54 for pumping grouting material 36 from a grout reservoir 66 into the element strings.

Figure 8A:
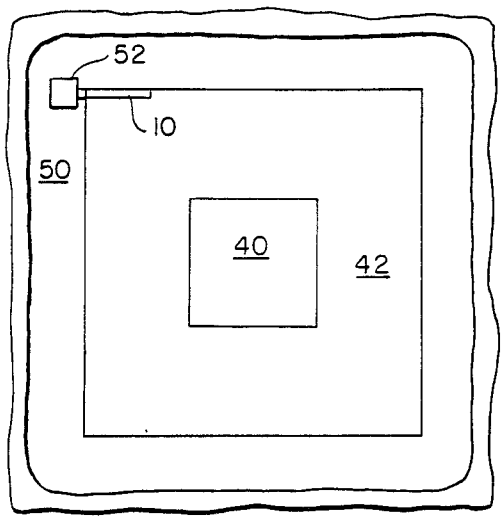
FIG. 8A shows the first step of constructing a floor where a first element is laid.

FIGS. 8A through 8D illustrates the method by which a completed floor 56 is formed under a typical chemical dump site 38. The first step in the formation of the floor is illustrated in FIG. 8A. A single floor element is shown being inserted under the dump site 38.

Drilling machine 52 initially drills a hole and then the floor element 10 is inserted therein. Alternatively, the machine 52 could hydraulically ram the element 10 into position and withdraw the dirt from inside the channel 16 by methods that are known to those of ordinary skill in the art.

Figure 8B:
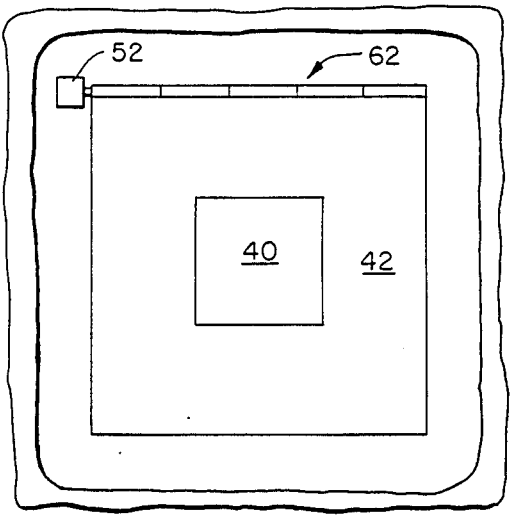
FIG. 8B shows the second step where a first string of elements are driven across the bottom of the dump site.

The second step in the method is illustrated in FIG. 8B where a first string 62 of elements 10 is driven across the bottom edge of the dump site 38. The front end 12 of each element 10 is mated with the rear end 14 of the next preceeding element 10. The elements can be welded butt to butt. Alternatively, a flare 34 can be formed in the rear 14 of an element 10 which receives the front end 12 of a succeeding floor element 10. It might even be desirable to weld the flare 34 to the front end of the succeeding floor element to improve the seal therebetween. Successive elements 10 are connected front-to-back until a completed first string 62 spans the width of the dump site 10. As shown in FIG. 6 the dump site 38 has a contamination area 40 that measure 80 ft.×80 ft. and a leaching area that measure 200 ft.×200 ft. for a total site area of 40,000 sq. ft. Each floor element 10 is preferably about 20 ft. long and one ft. wide on each side. Therefore approximately ten floor elements 10 are necessary to span the 200 ft. width of the leaching area. The first element string 62 is formed so that the male projection 20 of each element 10 is on the same side of the string 62.

Figure 8C:
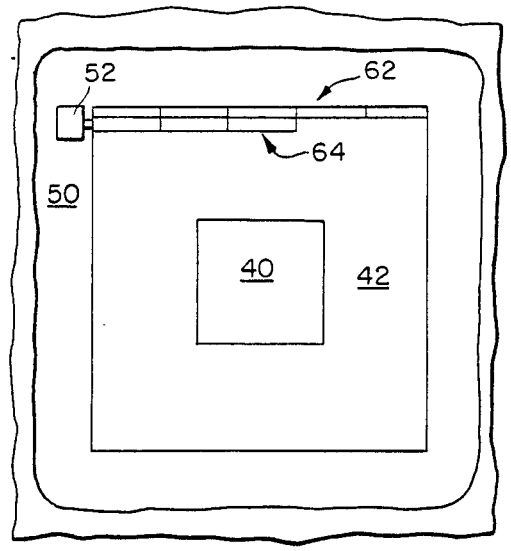
FIG. 8C shows the third step where a second string is laid next to the first string in such a way that the male section of one string lockingly engages the female section of the next adjacent string.

The third step of the method is illustrated in FIG. 8C. A second string 64 is laid adjacent to the first string 62. The male projection 20 of each floor element 10 of the second element string 64 is mated with the corresponding female groove 26 in the first string 62. This is accomplished by sliding the floor element 10 of each of the sections of the second string 64 along the length of the first string of elements 62 as the second string 64 is laid down. The floor elements 10 of the second string 64 are either welded or connected front to back in the manner previously described with respect to the forming of the string of first element 62. After the second string 64 has been formed in place, a third string is formed adjacent thereto. The process of laying strings adjacent to one another is continued until the floor 56 spreads across the length and width of the dump site 38. If a single element 10 has a cross sectional area of 1 ft.×1 ft., then it would take 200 element strings, each having ten elements per string, to cover a chemical dump site 38 of 40,000 sq. ft. In other words, it would take 2,000 floor elements 10 to cover the floor of the dump site 38.

Figure 8D:
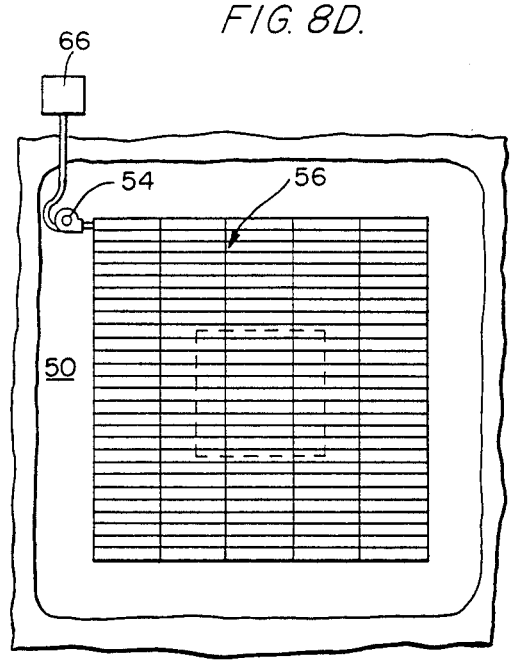
FIG. 8D shows the fourth and final step where grouting material is forced into the pipe strings to seal the area between the male and female connections.

The last step in the method is illustrated in FIG. 8D. Grouting material 36 is pumped from a reservoir 66 by pump 54 into the hollow channel 16 inside the pipe strings. Under sufficient pressure the grouting material 36 will fill up the element strings and seep through apertures 32 into the vicinity of the male projection/female groove locking area. The grouting material 36 therefore seals the space between adjacent elements thereby forming a completely liquid impervious floor 56 under the chemical dump site 38. Grouting material 36 preferably sets up and becomes hard after a period of time thereby making it impossible for the floor 56 to loose its liquid impervious properties.

Figure 8E:
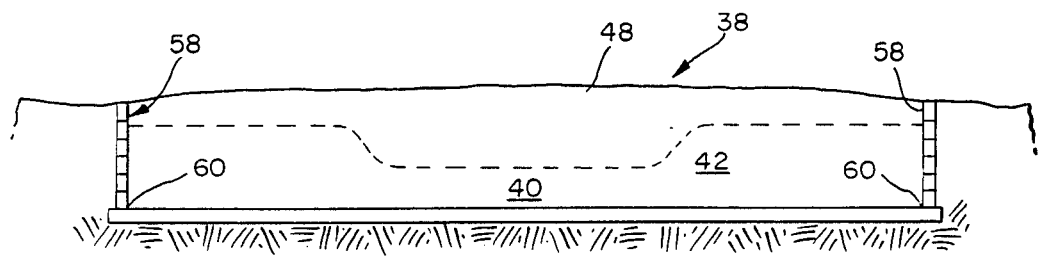
FIG. 8E shows the optional next step of constructing a vertical wall by the same technique and connecting the side wall to the newly constructed floor.

FIG. 8E illustrates an optional step in which a vertical side wall 58 is constructed around the dump site 38 by a techique similar to that described in steps 8A through 8D. The vertical wall 58 is formed in the manner previously described. The only difference is that step 8A through 8D are performed in the vertical plane rather than in the horizontal plane. The vertical side wall 58 formed in that manner is preferably connected by a circumferential weld 60 to the periphery of the containment floor 56. Alternatively, additional male and/or female portions may be added to the floor elements 10 so that they can mate at the intersection of the floor 56 and the vertical side wall 58.

Figure 9:
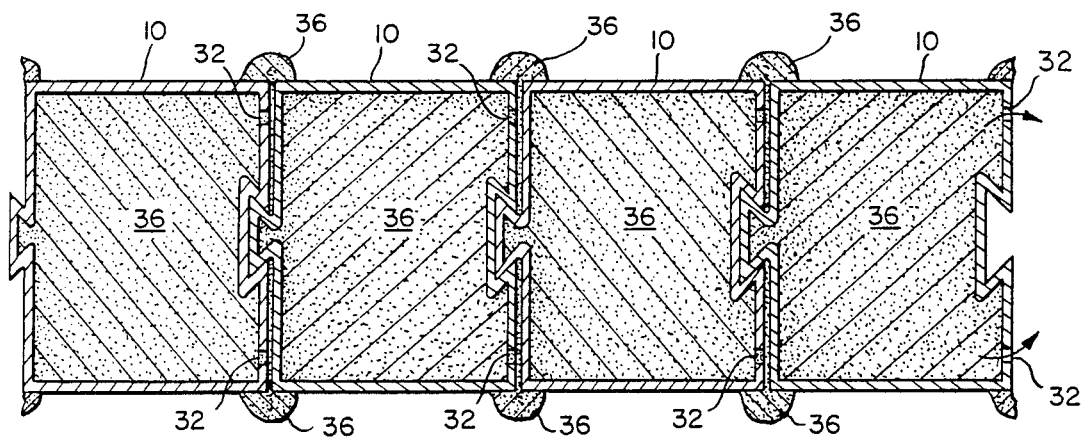
FIG. 9 is a cross-sectional view of the floor constructed by the method of FIGS. 8A–8D above showing the effective grouting sealing of adjacent floor elements.

FIG. 9 is a cross-sectional view of the completed floor 56 showing the manner in which adjacent floor elements 10 interlock and the way in which the grouting material 36 fills the space between floor elements 10. The grouting material 36 oozes out of the space between adjacent element 10 and forms a bubble or bead above and below the junction. Accordingly, the interstices between adjacent floor elements have a double seal. One seal is formed by the interlocking of the male and female portions 20 and 26 respectively. The other seal is formed by the grouting material 36 that fills the space between the adjacent elements 10. Moreover, the presence of grouting material 36 in the central channel 12 of th element strings further reinforces the elements 10 and, if the elements should corrode or otherwise loose their integrity, the grouting material 36 in the channels 10 forms a second line of protection.

After the floor 56 is completed it may be desirable to test the seals for imperviousness. This can be accomplished by running a pilot pipe under the floor 56 at regular intervals and then monitoring the sealed base for signs of leakage. Areas of leakage can then be studied and repaired.

While the invention has been described with reference to the preferred embodiment thereof it will be appreciated by those of ordinary skill in the art that various modifications can be made to the elements and the method by which the invention is practiced without departing from the spirit and scope thereof.

I claim:

1. A liquid impervious floor apparatus for placement under an existing contaminated site and formed from a plurality of elongated interlockable floor elements, said elongated interlockable floor elements comprising:
   an elongated body section;
   male projection means running substantially along the length of said elongated body section;
   female indentation means also running substantially along the length of said elongated body section for making sliding, interlockable contact with male projection means;
   a hollow, fluid conductable interior channel running the length of said elongated body section; and,
   aperture means located in the vicinity where interlockable elements are adjacent to each other for communicating said interior channel with the area where said interlockable elements are adjacent to each other,
   whereby a floor can be formed under an existing contaminated site by sliding one floor element past the other so that the male projection means on each floor element interlockingly engages the female indentation means of the next adjacent floor element until the floor is of the desired width.

2. The floor apparatus of claim 1 further comprising:
   sealing means for forming a liquid impervious seal in the area where said floor elements are adjacent to each other.

3. The apparatus of claim 2 wherein said floor elements include:

a top side;

a bottom side; and, first and second engaging sides for carrying said male projection means and said female indentation means respectively, wherein said aperture means are located in said engaging sides.

4. The apparatus of claim 3 wherein said sealing means comprises a grout means capable of being pumped through said hollow interior channel and through said aperture means so as to substantially fill up the volume in the area where interlocking floor elements are adjacent to each other thereby forming a liquid impervious seal between adjacent floor elements.

5. The apparatus of claim 4 further including:

flared means located at one end of each floor element for mating engagement with subsequent floor elements.

6. The apparatus of claim 5 wherein said male projection means comprises a dove-tail shaped rib and said female indentation means comprises a groove having a geometry complimentary to said dove-tail shaped rib, wherein said dove-tail shaped rib and said complimentary female groove are slidably interlockable together in a tongue-and-groove fashion.

7. An apparatus for forming a floor under an existing contaminated location, said apparatus comprising:

a plurality of elongated elements each having a hollow interior channel running between both ends thereof, said elongated elements each including on the exterior thereof male means and female means for sliding interlocking engagement with the female means and male means respectively of adjacent elements and aperture means for communicating said hollow interior channel with the area where interlocking elongated elements are adjacent to each other; and, grout means capable of being forced into said channel and through said aperture means and into the area where said interlocking elongated elements are adjacent to each other to thereby form a liquid impervious seal between adjacent elongated elements.

8. A method for forming a liquid impervious floor under an existing contaminated site from elongated hollow members each having a hollow interior channel running the length thereof and male and female means located on the exterior of said members for guiding said members into sliding interlockable engagement with each other and aperture means for communicating said hollow interior channel with the area where interlockable elongated hollow members are adjacent to each other, said method comprising the steps of:

engaging a plurality of said members together by sliding said male means into the female means of the next adjacent member; and, forcing grout into the hollow interior channel of said members and therefore into the area where interlockable members are adjacent to each other, thereby forming a liquid impervious seal between adjacent members.

9. The method of claim 8 further comprising the step of:

engaging said members end-to-end to form a string of said members; and, engaging the male means of one string of members with the female means of the next adjacent string of members until the desired floor width has been achieved.

* * * * *